(12) United States Patent
La Fata

(10) Patent No.: US 10,439,713 B1
(45) Date of Patent: Oct. 8, 2019

(54) SYSTEM AND METHOD FOR RECEIVING SIGNAL INFORMATION FOR NETWORKING USING A FREE SPACE OPTICAL LINK

(71) Applicant: The Boeing Company, Chicago, IL (US)

(72) Inventor: Christopher M. La Fata, Berkeley, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/922,542

(22) Filed: Mar. 15, 2018

(51) Int. Cl.
| | |
|---|---|
| *H04B 10/67* | (2013.01) |
| *H04B 10/11* | (2013.01) |
| *G02B 13/00* | (2006.01) |
| *G02B 7/02* | (2006.01) |

(52) U.S. Cl.
CPC ............. *H04B 10/11* (2013.01); *G02B 7/021* (2013.01); *G02B 13/005* (2013.01); *H04B 10/67* (2013.01)

(58) Field of Classification Search
None
See application file for complete search history.

(56) References Cited

U.S. PATENT DOCUMENTS

| | | | | | |
|---|---|---|---|---|---|
| 4,120,002 | A | * | 10/1978 | Lieber .................... | H01J 31/08 313/381 |
| 4,794,296 | A | * | 12/1988 | Warde .................. | H01J 31/065 174/50.5 |
| 5,012,081 | A | * | 4/1991 | Jungwirth ............. | G01S 3/7867 250/203.6 |
| 5,263,075 | A | * | 11/1993 | McGann ................ | G21K 1/025 378/147 |
| 5,267,062 | A | * | 11/1993 | Bottorf ............. | G02F 1/133617 349/69 |
| 5,563,653 | A | * | 10/1996 | Floryan ................. | H01J 43/246 250/214 R |

(Continued)

FOREIGN PATENT DOCUMENTS

| | | |
|---|---|---|
| CN | 102053294 B | 5/2013 |
| EP | 2179315 A1 | 4/2010 |

OTHER PUBLICATIONS

Anonymous: "1100S CCD Camera", Aug. 2, 2016 (Aug. 2, 2016),XP055604770, Retrieved from the Internet:URL: https://web.archive.org/web/20160801195710/http://www.specinst.com/Brochures%20Rev%20B/1100S-camera-proch_RevB.pdf Aug. 2, 2016.

(Continued)

*Primary Examiner* — Li Liu
(74) *Attorney, Agent, or Firm* — Parsons Behle & Latimer

(57) ABSTRACT

A system for optical detection may include a focal plane array. The system may further include one or more lenses configured to focus a collimated light beam received at the one or more lenses onto the focal plane array, where a position of the collimated light beam on the focal plane array is based on an incident angle of propagation of the collimated light beam at the one or more lenses. The system may also include a micro-channel plate collimator positioned within an optical path of the collimated light beam. The system may include a processor configured to determine the incident angle of propagation of the collimated light beam and to retrieve data encoded within the collimated light beam.

20 Claims, 8 Drawing Sheets

(56) References Cited

U.S. PATENT DOCUMENTS

| | | | | |
|---|---|---|---|---|
| 5,727,044 | A * | 3/1998 | Fraser | G21K 1/025 250/505.1 |
| 5,760,852 | A | 6/1998 | Wu et al. | |
| 6,045,677 | A * | 4/2000 | Beetz, Jr. | C25D 11/02 205/122 |
| 6,349,174 | B1 * | 2/2002 | Ray | G01S 17/89 348/E13.018 |
| 6,643,010 | B2 * | 11/2003 | Rahbar-Dehghan | B01L 3/5025 356/244 |
| 7,378,626 | B2 * | 5/2008 | Fetterly | F41G 7/224 244/1 R |
| 9,177,764 | B1 * | 11/2015 | Baney | H01J 9/14 |
| 9,355,828 | B1 * | 5/2016 | Smith | H01J 49/0031 |
| 2002/0141011 | A1 * | 10/2002 | Green | H04B 10/1123 398/127 |
| 2004/0017981 | A1 * | 1/2004 | Jovanovich | B01L 3/563 385/68 |
| 2005/0017389 | A1 * | 1/2005 | Petervary | B26F 1/24 264/41 |
| 2005/0249502 | A1 * | 11/2005 | Chen | G01S 7/4812 398/118 |
| 2006/0017928 | A1 | 1/2006 | Crowther | |
| 2006/0289746 | A1 * | 12/2006 | Raznikov | G01N 27/622 250/294 |
| 2007/0230664 | A1 * | 10/2007 | Sipila | G21K 1/025 378/149 |
| 2007/0237490 | A1 * | 10/2007 | Reininger | G02B 6/06 385/147 |
| 2011/0058167 | A1 * | 3/2011 | Knox | G01N 15/06 356/338 |
| 2011/0122994 | A1 * | 5/2011 | Grubsky | G01T 1/20 378/62 |
| 2011/0181864 | A1 * | 7/2011 | Schmitt | G01S 17/95 356/28 |
| 2012/0161010 | A1 * | 6/2012 | Azzazy | H01J 29/89 250/353 |
| 2012/0249999 | A1 * | 10/2012 | Stettner | G01S 7/4813 356/5.01 |
| 2013/0076900 | A1 * | 3/2013 | Mrozek | G02B 13/14 348/144 |
| 2013/0114147 | A1 * | 5/2013 | Stark | G02B 13/06 359/664 |
| 2014/0043320 | A1 * | 2/2014 | Tosaya | G02B 27/0172 345/419 |
| 2015/0311054 | A1 * | 10/2015 | Scime | H01J 49/48 250/281 |

OTHER PUBLICATIONS

European Patent Office; Extended European Search Report for Application No. 19154912.0 dated Aug. 1, 2019.

Long Li, et al; High Capacity Free-Space Opical Communications Between a Ground Transmitter and a Ground Receiver via UAV Using Multiplexing of Multiple Orbital-Angular-Momentum Beams; Scientific Reports Dec. 12, 2017.

Anonymous: "1100S CCD Camera", Aug. 2, 2016 (Aug. 2, 2016),XP055604770, Retrieved from the Internet:URL: https://web.archive.org/web/20160801195710/http://www.specinst.com/Brochures%20Rev%20B/1100S-camera-broch_RevB.pdf Aug. 2, 2016.

* cited by examiner

SYSTEM AND METHOD FOR RECEIVING SIGNAL INFORMATION FOR NETWORKING USING A FREE SPACE OPTICAL LINK

FIELD OF THE DISCLOSURE

This disclosure is generally related to free space optical linking and, in particular, to a system and method for receiving signal information for networking using a free space optical link.

BACKGROUND

Typical free space optical link methods enable wide field of view operations by employing mechanical gimbals to slew a narrow field of view optical aperture over a wide angle. Initial laser communication signal discovery, acquisition, and tracking depend upon the mechanical gimbal pointing the narrow field of view optical aperture correctly for signal acceptance. Discovery of a new participant desiring to enter the network typically requires an additional non-directional laser beacon source and receiver aperture able to capture light from beacon sources over a wide angle field of view. The receiver aperture may determine the location of the new participant using a wide field of view optical receiver. After the location of the source relative to the receiver is established, a separate narrow-field aperture may be pointed toward the source to achieve an adequate signal-to-noise ratio for processing and demodulation of the optical signal.

Wide field of view optical receivers are typically subject to significant noise associated with an incoming collimated laser light signal. While able to determine an incident angle of the laser light signal, wide field of view optical receivers are typically unable to demodulate and retrieve any data being carried by the laser light signal. A separate, narrow field optical receiver may be used to demodulate the signal. Multiple receivers add to the cost and decrease the efficiency of free space optical link systems. Further, using mechanical gimbals to direct the narrow field optical receiver to a newly acquired network participant may introduce additional mechanical systems, which add to the complexity of systems.

SUMMARY

Disclosed is a system that enables a wide field of view optical receiver to both determine an incident angle of an incoming signal and demodulate the signal to retrieve data transmitted therein. In an embodiment, a system for optical detection includes a focal plane array. The system further includes one or more lenses configured to focus a collimated light beam received at the one or more lenses onto the focal plane array, where a position of the collimated light beam on the focal plane array is based on an incident angle of propagation of the collimated light beam at the one or more lenses. The system also includes a micro-channel plate collimator positioned within an optical path of the collimated light beam. The system includes a processor configured to determine the incident angle of propagation of the collimated light beam and to retrieve data encoded within the collimated light beam.

In some embodiments, the micro-channel plate collimator is in an electrically passive state. In some embodiments, the micro-channel plate collimator includes an opaque substrate having a first surface and a second surface, and a plurality of transparent channels within the opaque substrate. In some embodiments, the plurality of transparent channels within the opaque substrate are arranged in a square lattice pattern. In some embodiments, the plurality of transparent channels within the opaque substrate are arranged in a triangle lattice pattern. In some embodiments, the plurality of transparent channels within the opaque substrate are arranged in a square lattice pattern along a first portion of the micro-channel plate collimator, and the plurality of transparent channels within the opaque substrate are arranged in a triangle lattice pattern along a second portion of the micro-channel plate collimator. In some embodiments, a spatial density of the transparent channels within the opaque substrate along a first portion of the micro-channel plate collimator is less than along a second portion of the micro-channel plate collimator.

In some embodiments, the first surface is convexly curved and the second surface is concavely curved. In some embodiments, a detection surface of the focal plane array is convexly curved. In some embodiments, the system includes a dewar, where the focal plane array is positioned within the dewar, and a cold stop. In some embodiments, the micro-channel plate collimator is positioned within the dewar. In some embodiments, the micro-channel plate collimate is positioned outside of the dewar. In some embodiments, at least one of the one or more lenses extends through an exterior boundary of the dewar.

In an embodiment, a method for optical detection includes receiving a collimated light beam at one or more lenses. The method further includes focusing the collimated light beam onto a focal plane array, where a position of the collimated light beam on the focal plane array is based on an incident angle of propagation of the collimated light beam at the one or more lenses. The method also includes passing the collimated light beam through a micro-channel plate collimator positioned within an optical path of the collimated light beam. The method includes determining the incident angle of propagation of the collimated light beam based on the position of the collimated light beam on the focal plane array. The method further includes retrieving data encoded within the collimated light beam.

In some embodiments, the method includes receiving the collimated light beam into a dewar before the collimated light beam is passed through the micro-channel plate collimator. In some embodiments, the method includes receiving the collimated light beam into a dewar after the collimated light beam is passed through the micro-channel plate collimator.

In an embodiment, a micro-channel plate collimator apparatus includes an opaque substrate having a first surface and a second surface. The apparatus further includes a plurality of transparent channels within the opaque substrate, where a spatial density of the transparent channels within the opaque substrate is greater along a first portion of the micro-channel plate collimator than along a second portion of the micro-channel plate collimator.

In some embodiments, the plurality of transparent channels are arranged in a square lattice pattern along the first portion of the micro-channel plate collimator, and the plurality of transparent channels are arranged in a triangle pattern along the second portion of the micro-channel plate collimator. In some embodiments, the plurality of transparent channels have a first cross-section radius along the first portion of the micro-channel plate and a second cross-section radius along the second portion, where the first cross-section radius is smaller than the second cross-section radius. In some embodiments, the plurality of transparent channels have a first depth along the first portion of the micro-channel plate and a second depth along the second portion, where the first depth is smaller than the second depth.

Figure 1:
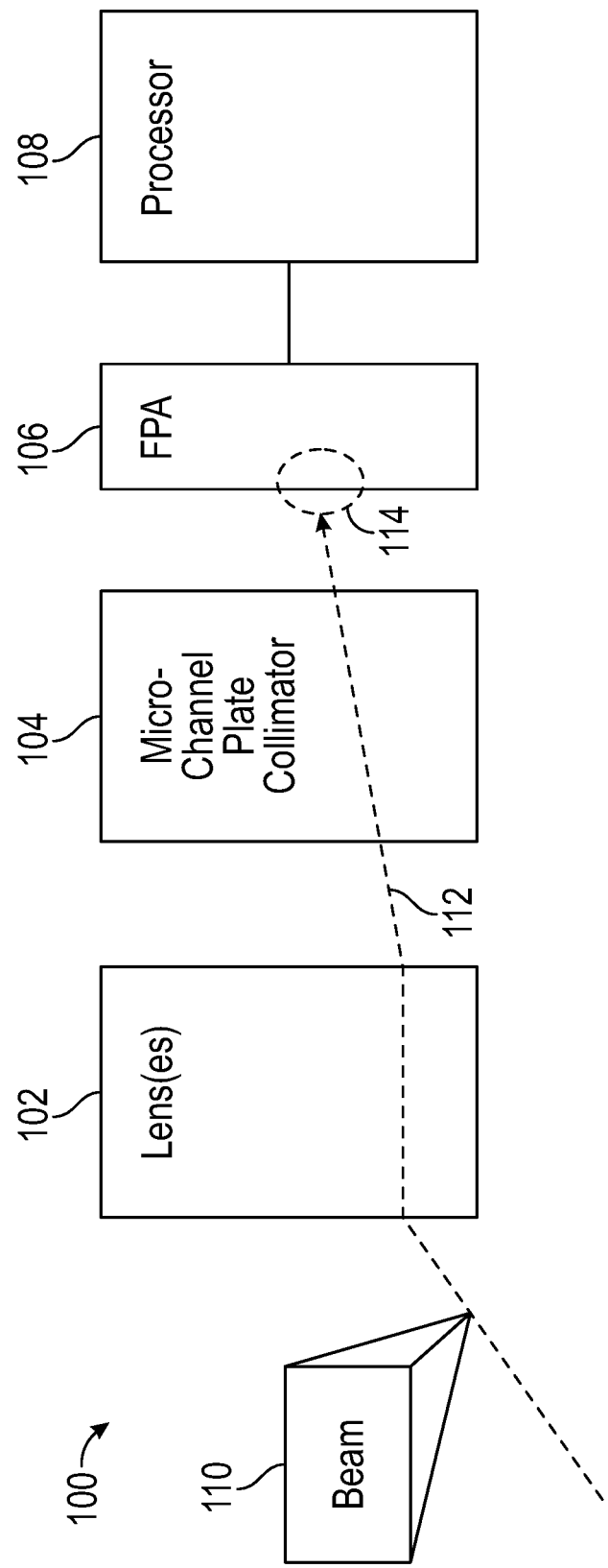
FIG. 1 depicts an embodiment of a system for receiving signal information using a free space optical link.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Referring to FIG. 1, a block diagram of an embodiment of a system 100 for receiving signal information using a free space optical link is depicted. The system may include one or more lenses 102, a micro-channel plate collimator 104, a focal plane array 106, and a processor 108. The system may be implemented in a vehicle, such as aircraft, for vehicle-to-vehicle communication. Other applications are also possible.

The one or more lenses 102 may direct a collimated light beam 110, such as a communication grade laser, onto the focal plane array 106 along an optical path 112. In order to enable communication at wide angles, the lenses 102 may be configured in a wide-field of view (WFOV) configuration. Further, the lenses 102 may direct the light beam 110 such that a position 114 of the collimated light beam 110 on the focal plane array 106 is based on an incident angle of propagation, in azimuth and elevation, of the collimated light beam 110 as it reaches the lenses 102. In an embodiment, the lenses 102 include a complex multi-lens optical system as described with reference to the embodiments herein.

The micro-channel plate collimator 104 may be configured as a filter to reduce the collimated light beam 110. As such, the micro-channel plate collimator 104 may be in an electrically passive state. As used herein, electrically passive means that no external voltage is applied across the micro-channel plate collimator 104, enabling it to filter noise from the collimated light beam 110 rather than perform amplification processes.

The processor 108 may be communicatively coupled to the focal plane array 106. As such the processor 108 may be able to determine the position 114 of the collimated light beam 110 on the focal plane array 106. Based on the position 114, the processor may be configured to calculate the incident angle of propagation of the collimated light beam 110, thereby pinpointing a source of the collimated light beam 110. In addition, the collimated light beam 110, having been filtered by the micro-channel plate collimator, may be demodulated by the processor 108 to retrieve data encoded therein. In that way, a communication link may be set up with the source of the collimated light beam 110.

The processor 108 may include a central processing unit (CPU), a graphical processing unit (GPU), a digital signal processor (DSP), a peripheral interface controller (PIC), or another type of microprocessor. It may be implemented as an integrated circuit, a field programmable gate array (FPGA), an application specific integrated circuit (ASIC), a combination of logic gate circuitry, other types of digital or analog electrical design components, or the like, or combinations thereof. In some embodiments, the processor 108 may be distributed across multiple processing elements, relying on distributive processing operations.

Further, the processor may include memory such as random access memory (RAM), read only memory (ROM), magnetic disk memory, optical disk memory, flash memory, another type of memory capable of storing data and processor instructions, or the like, or combinations thereof. In some embodiments, the memory, or portions thereof, may be located externally or remotely from the rest of the processor 108. The memory of the processor 108 may store instructions that, when executed by the processor 108, cause the processor 108 to perform operations. The operations may correspond to any operations described herein for receiving signal information using a free space optical link.

During operation, the collimated light beam 110 may be received at the lenses 102. The lenses 102 may direct the collimated light beam 110 onto the focal plane array 106. The light beam 110 may follow the optical path 112, entering the lenses at an angle of incident and eventually reaching the focal plane array 106 at the position 114. The position 114 where the collimated light beam 110 strikes the focal plane array 106 may enable the processor 108 to determining a position of the source of the collimated light beam 110. The micro-channel plate collimator 104 may be positioned within the optical path 112 of the light beam 110 in order to reduce processed background noise entering portions of the one or more lenses 102 and thus increase the processed signal-to-noise ratio. Although depicted as being between the lenses 102 and the focal plane array 106, the micro-channel plate collimator 104 may be positioned anywhere along the path 112 as described in the embodiments herein.

A benefit of the system 100 is that a single wide angle optical system may both determine the position of the source of the collimated light beam 110 and demodulate the collimated light beam 110 to retrieve data therefrom, as compared to other systems that may require an additional narrow field of view optical system to demodulate the signal. Thus, the complexity and weight of the system 100 may be reduced as compared to typical free space optical receiver systems. Other advantages may exist.

Figure 2:
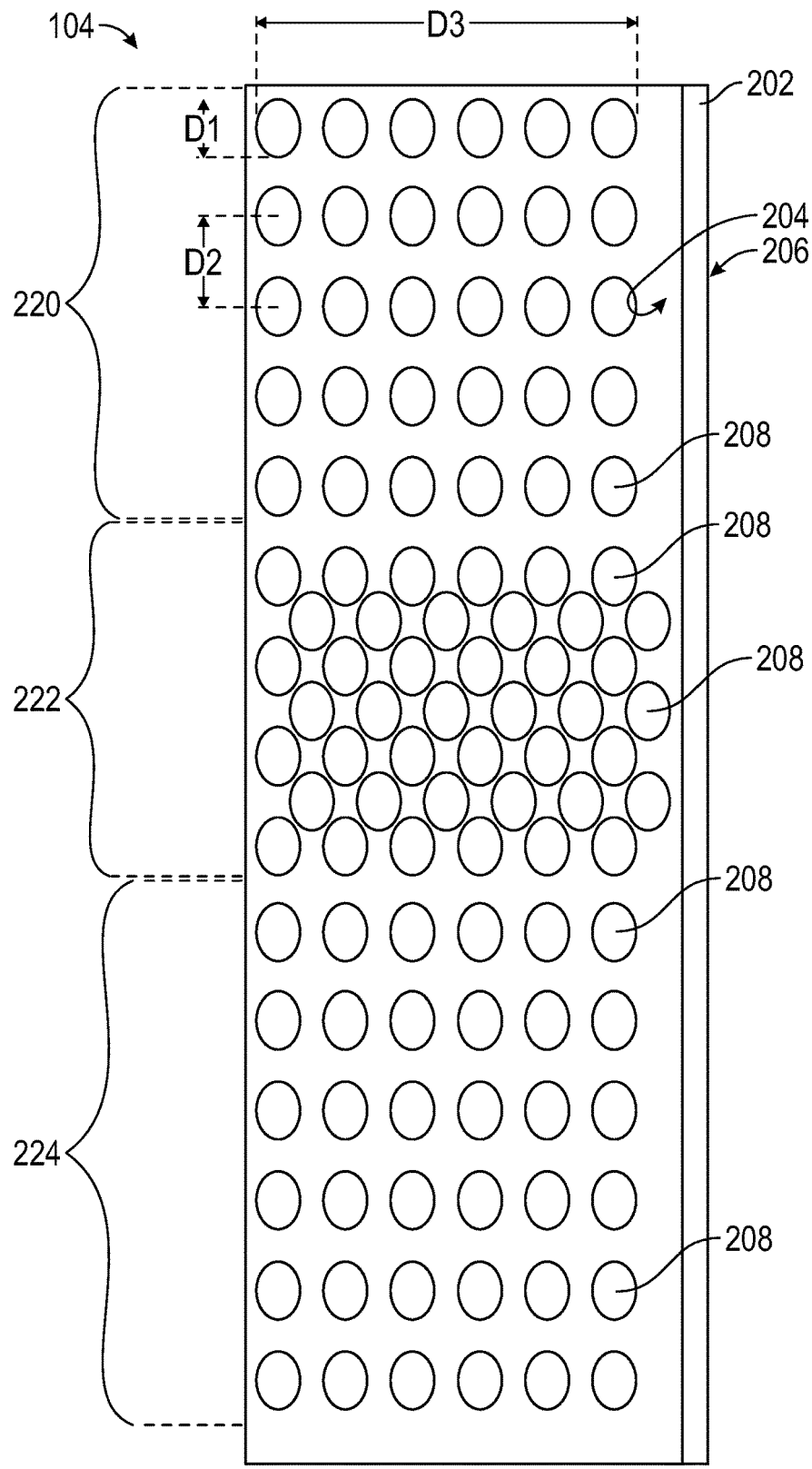
FIG. 2 depicts an embodiment of a micro-channel plate collimator usable with a system for receiving signal information using a free space optical link.

Referring to FIG. 2, an embodiment of a micro-channel plate collimator 104 usable with a system for receiving signal information using a free space optical link is depicted. The micro-channel plate collimator 104 may include an opaque substrate 202 having a first surface 204 and a second surface 206. The micro-channel plate collimator 104 may include a plurality of transparent channels 208.

The micro-channel plate collimator 104 may include a first portion 220 in which the transparent channels 208 are arranged in a first pattern, a second portion 222 in which the transparent channels 208 are arranged in a second pattern, and a third portion 224 in which the transparent channels 208 are arranged in a third pattern.

In the first portion 220 and the third portion 224, the transparent channels 208 may be arranged in a square lattice. Each of the transparent channels 208 may have a diameter D1 and may be separated by a spacing D2. The transparent channels 208 may be concentrated within an area determined by a distance D3. Each of the parameters, D1, D2, and D3, may affect both the intensity and the level of noise associated with a collimated light beam passing through the micro-channel plate collimator 104.

In the second portion 222, the transparent channels 208 may be arranged in a triangular lattice. Because the transparent channels 208 within the first portion 220 and the third portion 224 are arranged in a square lattice, and the transparent channels 208 within the second portion 222 are arranged in a triangular lattice, a spatial density of the transparent channels 208 within the first portion 220 and the third portion 224 of the micro-channel plate collimator 104 is less than within the second portion 222 of the micro-channel plate collimator. The different spatial density may substantially increase the intensity of a beam of light passing through the second portion 222 relative to the first portion 220 and the third portion 224. Hence, the second portion 222 may be referred to as a pupil. As used herein, the term pupil refers to a portion of the micro-channel plate collimator, such as the second portion 222, that permits significantly more light through than other portions, such as the first portion 220 and the third portion 224.

In some embodiments, the transparent channels 208 may have a first cross-section radius along the first portion 220 and the third portion 224 of the micro-channel plate collimator 104 and a second cross-section radius along the second portion 222. For example, D1 may be smaller in the first portion 220 and third portion 224 than in the second portion 222. This may enable more light to penetrate the micro-channel plate collimator 104 in the second portion 222. However, a larger diameter D1 parameter may also permit more interference to pass through, thereby decreasing a signal-to-noise ratio of a collimated light beam. Each of the parameters D1, D2, and D3 may be optimized based on a particular application to enable sufficient light intensity to pass through the micro-channel plate collimator 104 for detection and for demodulation.

It should be noted that for added clarity, the sizes and positions of the transparent channels 208 relative to the substrate 202 are depicted disproportionately to how they would appear in practice. For example, in practice the transparent channels 208 may be more numerous and much smaller than depicted in FIG. 2. Further, although FIG. 2 depicts the micro-channel plate collimator 104 as having a rectangular shape, in practice it may have other shapes, such as a circular shape. In that case, the second portion 222 may be a circular center to of the micro-channel collimator 104 and the first portion 220 and the second portion 224 may correspond to annular areas surrounding the second portion 222.

Figure 3:
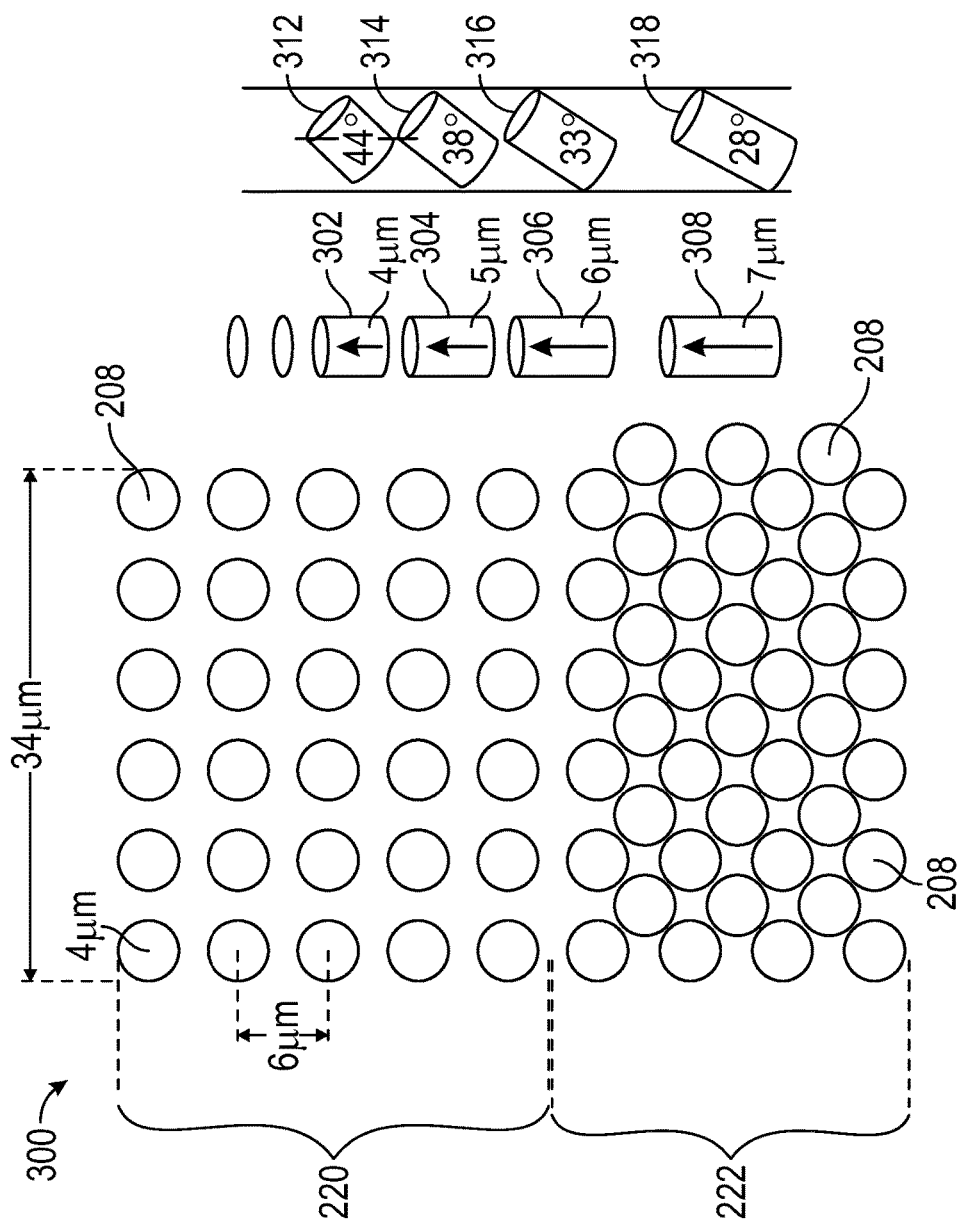
FIG. 3 depicts an embodiment of a channel pattern usable with a micro-channel plate collimator for a system for receiving signal information using a free space optical link.

Referring to FIG. 3, a sample pattern 300 of the plurality of transparent channels 208 is depicted. In the sample pattern 300, the diameter D1 may correspond to 4 µm, the spacing D2 may correspond to 6 µm, and the distance D3 may correspond to 34 µm. It should be noted that these parameters are for illustrative purposes only. Other measurements may be used and fall within the scope of this disclosure. The measurements may be determined based on parameters, such as wavelength, phase, and intensity, of associated with a collimated light beam (e.g., a laser) used. In general, the diameter D1 is selected to be large enough to avoid interfering with the collimated light beam at a wavelength level.

As described with reference to FIG. 2, in FIG. 3 the transparent channels 208 may have a square lattice pattern along a first portion 220 of the pattern 300 and a triangle lattice pattern along a second portion 222 of the pattern 300. This enables more light to pass through the second portion 222 than the first portion 220. Although not depicted in FIG. 3, permitting more light to pass through the second portion 222 may also be achieved by decreasing the spacing D2 between each transparent channel 208 within the second portion 222 to less than 6 µm or by increasing the diameter D1 of the transparent channels 208 within the second portion to greater than 4 µm. These are design parameters that may be modified based on particular applications.

Additional design parameters include a depth of each of the transparent channels 208. The depth may vary continuously at different points within the pattern 300. For example, within the first portion 220 of the pattern 300 a first depth 302 may be relatively small. For example, in FIG. 3 the first depth 302 is depicted as 4 µm. Moving along the pattern 300 toward the second portion 222, the depths of each of the transparent channels 208 may gradually increase. For example, passing from the first portion 220 to the second portion 222, a second depth 304 may correspond to 5 µm, a third depth 306 may correspond to 6 µm, and a fourth depth 308 may correspond to 7 µm.

Each of the depths 302-308 may limit light passing through the transparent channels 208 based on an incident angle of the light. For example, the first depth 302 may limit light having an incident angle of propagation that exceeds a first angle 312, which corresponds to 44° in the example of FIG. 3. The second depth 304 may limit light having an incident angle of propagation that exceeds a second angle 314 of 38°. The third depth 306 may limit light having an incident angle of propagation that exceeds a third angle 316 of 33°. The fourth depth 308 may limit light having an incident angle of propagation that exceeds a fourth angle 318 of 28°. As the depths 302-308 increase, less interference may be permitted to pass through the pattern 300. However, the intensity of light passing through may also be decreased, which increases the difficulty of demodulating a received signal to retrieve data encoded therein.

An advantage of the pattern 300 is that more surface area is provided for light to enter the transparent channels 208 within the second portion 222 to allow for a greater intensity of light in areas where the transparent channels 208 have greater depths, thereby permitting demodulation of a received beam of light, while also enabling a determination of the incident angle of propagation of the light. Other advantages may exist.

Figure 4:
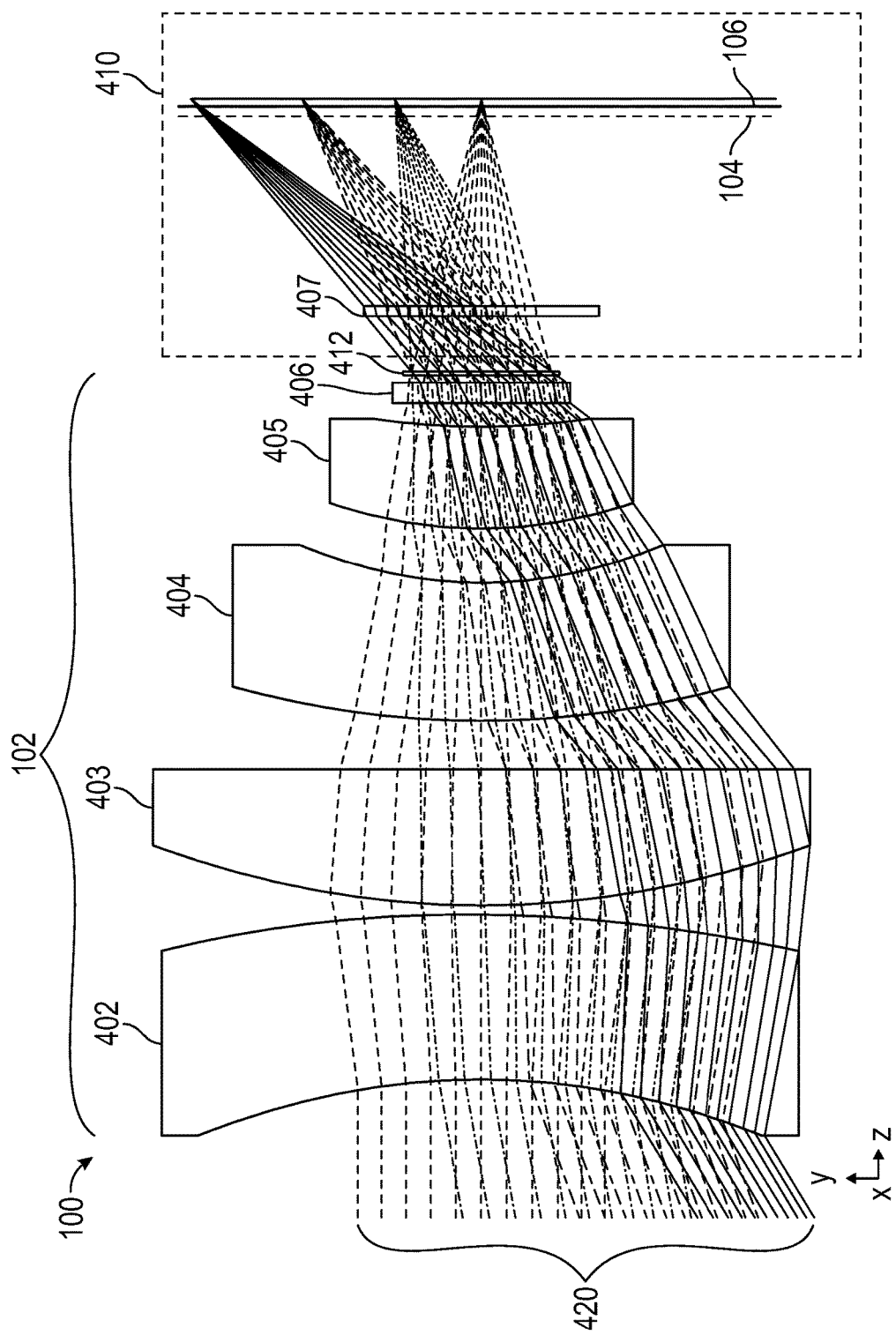
FIG. 4 depicts an embodiment of a system for receiving signal information using a free space optical link.

Referring to FIG. 4, an embodiment of a system 100 for receiving signal information using a free space optical link is depicted. The system 100 includes the one or more lenses 102, the micro-channel plate collimator 104, and the focal plane array 106. Although not depicted in FIG. 4, the system 100 also includes the processor 108.

In FIG. 4, the lenses 102 are depicted in a configuration usable to enable wide field of view operation. The lenses 102 may include a first lens 402, a second lens 403, a third lens 404, a fourth lens 405, a fifth lens 406, and a sixth lens 407. The lenses 402-407 may be any combination of biconvex lenses, plano-convex lenses, positive meniscus lenses, negative meniscus lenses, plano-concave lenses, and biconcave lenses, as may be beneficial for particular applications. The precise lenses used and their configurations are not intended to be limited to those depicted in the figures.

The system 100 may include a dewar 410. As persons of ordinary skill in the relevant art will recognize, a dewar may be a vacuum-insulated container having a first container encompassed within a second container. Air may be evacuated from a space between the first and second containers in order to thermally isolate the contents of the first container. Other embodiments of a dewar may be also be used as would be understood by persons of ordinary skill in the art having the benefit of this disclosure. A cold stop 412, which may include a cryogenically cold aperture, may permit a directed collimated beam to pass to the focal plane array while emitting virtually no interfering energy. The dewar 410 and the cold stop 412 may enable the focal plane array 106 to detect light at low temperatures, with little or no interference, which may be beneficial for accurately determining the incident angle of propagation of a received beam of light and/or for demodulating a signal encoded therein. Some of the lenses 102 (e.g., the lens 407) may be positioned within the dewar 410.

In the embodiment of FIG. 4, the micro-channel plate collimator 104 may be positioned adjacent to the focal plane array 106 within the dewar 410. During operation, multiple beams of collimated light 420 may be received at the one or more lenses 102. The multiple beams of collimated light 420 may each have an incident angle of propagation upon reaching the lenses 102. The lenses 102 may direct the multiple beams of collimated light 420 through the cold stop 412 into the dewar 410 and onto the focal plane array 106. A position of the multiple light beams 420 may depend on the incident angle of propagation of each individual light beam when arriving at the lenses 102. Based on the position on the focal plane array 106, the incident angle of propagation may be determined, enabling the position of a source of each of the multiple light beams 420 to likewise be determined.

The micro-channel plate collimator 104 may be positioned within a path of the multiple light beams 420, causing them to pass through the micro-channel plate collimator 104 before striking the focal plane array 106. As described herein, the micro-channel plate collimator 104 may filter noise from the multiple light beams while simultaneously permitting sufficient light intensity to pass therethrough for demodulating the multiple light beams to extract data therefrom.

Figure 5:
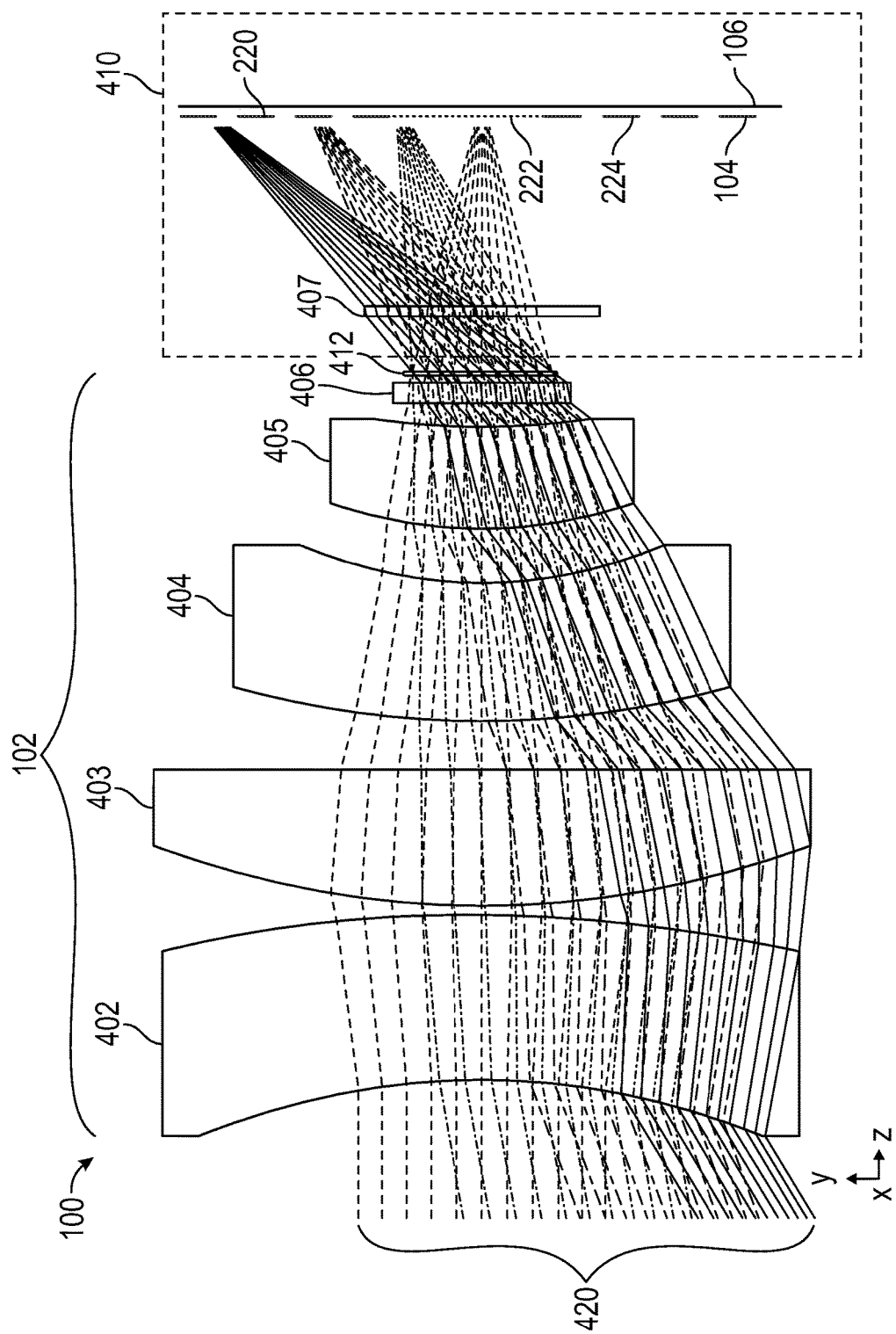
FIG. 5 depicts an embodiment of a system for receiving signal information using a free space optical link.

Referring to FIG. 5, an embodiment of a system 100 for receiving signal information using a free space optical link is depicted. As depicted in FIG. 5, the micro-channel plate collimator 104 may include a first portion 220, a second portion 222, and a third portion 224. As described herein, the second portion 222 may correspond to a pupil between the first portion 220 and third portion 224. As such, more light may be permitted to pass through the second portion 222 than the first portion 220 and the third portion 224.

Figure 6:
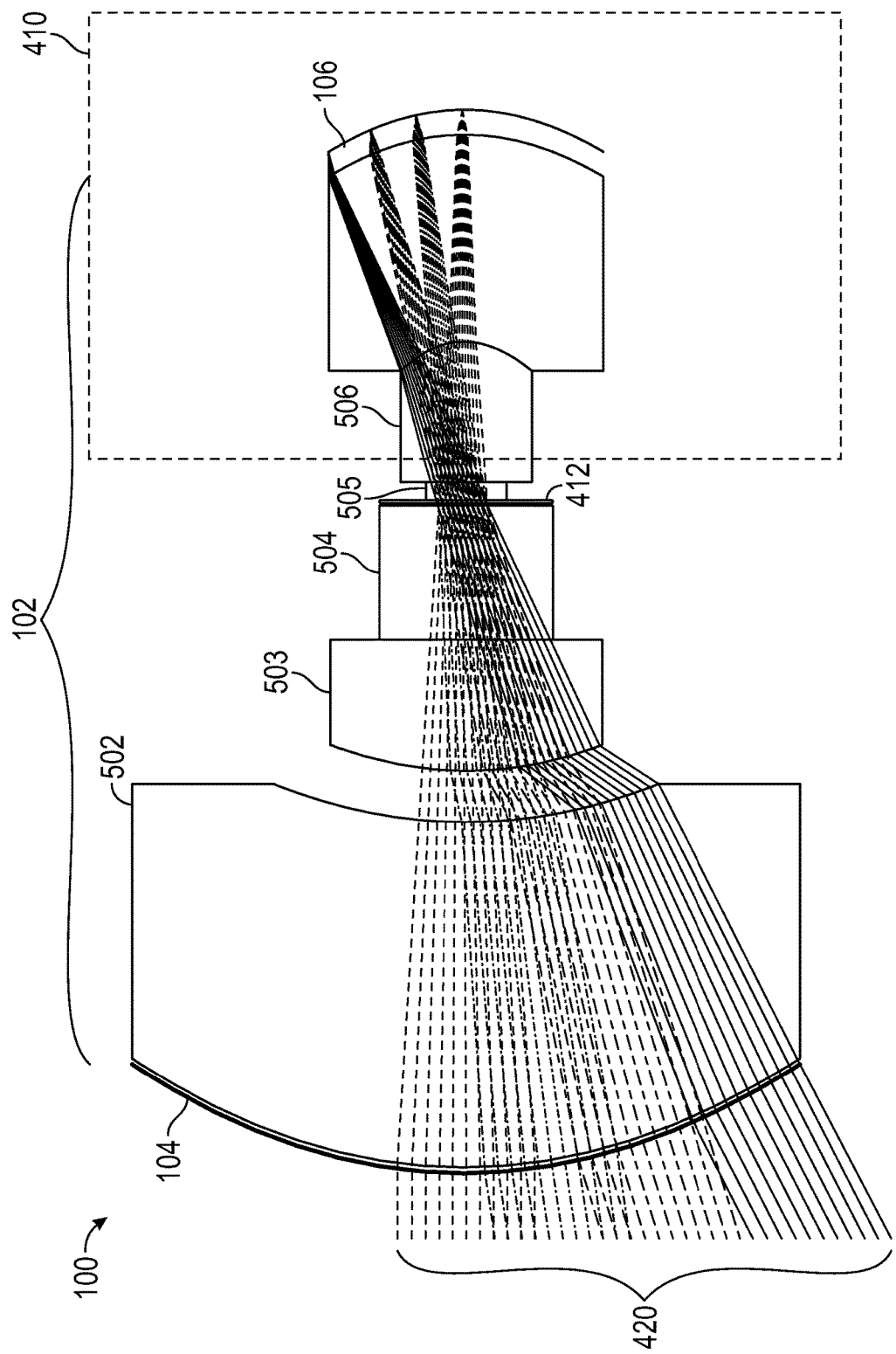
FIG. 6 depicts an embodiment of a system for receiving signal information using a free space optical link.

Referring to FIG. 6, an embodiment of a system for receiving signal information using a free space optical link is depicted. The system 100 includes the one or more lenses 102, the micro-channel plate collimator 104, and the focal plane array 106. Although not depicted in FIG. 4, the system 100 also includes the processor 108. The one or more lenses 102 of the embodiment of FIG. 6 may include a first lens 502, a second lens 503, a third lens 504, a fourth lens 505, and a fifth lens 506. The one or more lenses 102 may be simplified compared to FIG. 5. Further, at least one of the lenses 102 (e.g., lens 506) may extend through an exterior boundary of the dewar 410.

Another feature of the embodiment of FIG. 6 is that both the micro-channel plate collimator 104 and the focal plane array 106 may be curved. For example, a first surface of the micro-channel plate collimator 104 (e.g., the first surface 204 of FIG. 2) may be convexly curved and a second surface (e.g., the second surface 206 of FIG. 2) may be concavely curved. The focal plane array 106 may be similarly convexly curved in order to enable the one or more lenses 102 to have a reduced complexity.

In the embodiment of FIG. 6, the micro-channel plate collimator 104 is positioned outside the dewar 410 in a path of the multiple light beams 420 before the light beams 420 enter the first lens 502. However, other positions are possible.

Figure 7:
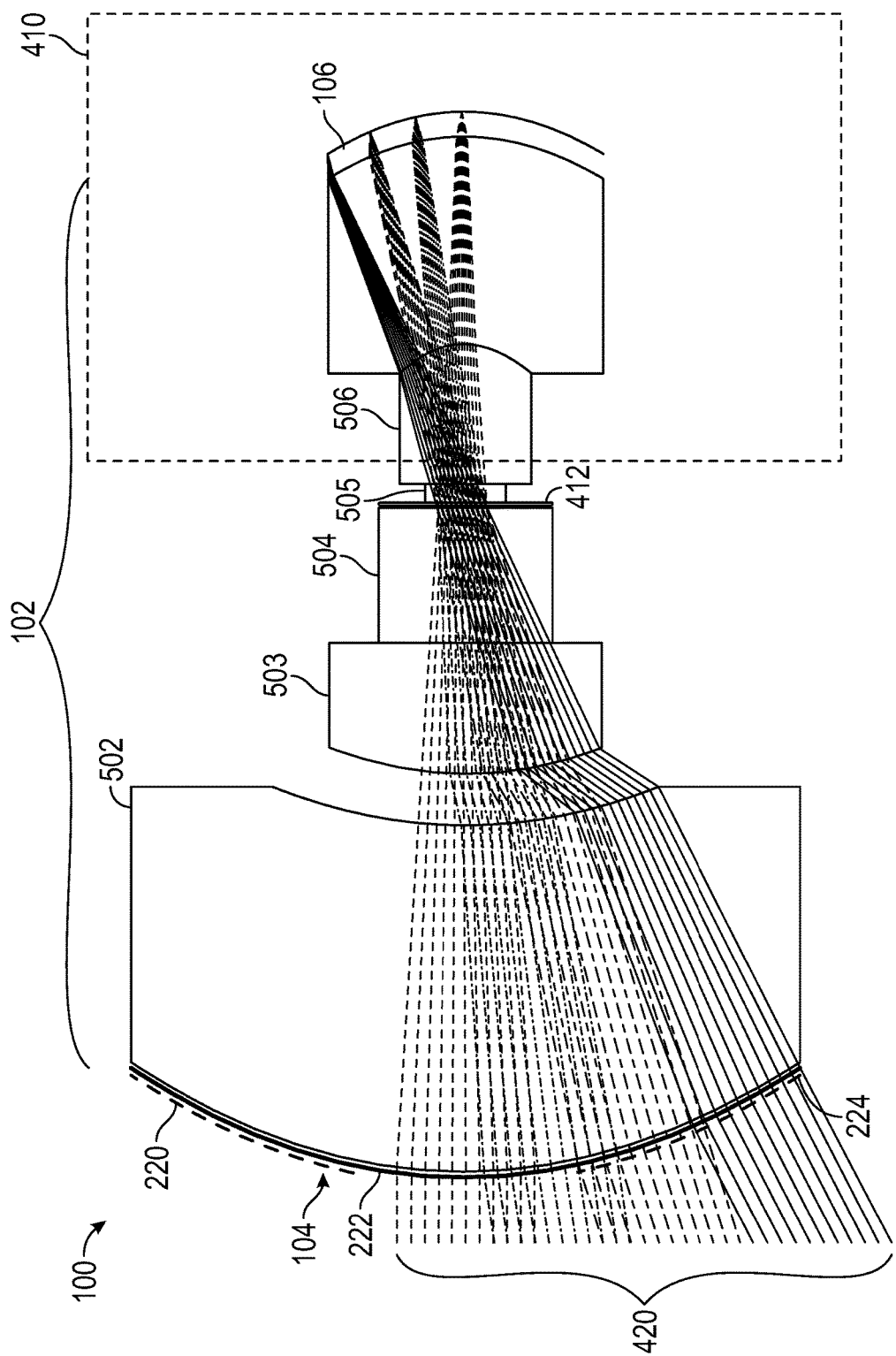
FIG. 7 depicts an embodiment of a system for receiving signal information using a free space optical link.

Referring to FIG. 7, an embodiment of a system for receiving signal information using a free space optical link is depicted. As depicted in FIG. 7, the micro-channel plate collimator 104 may include a first portion 220, a second portion 222, and a third portion 224. As described herein, the second portion 222 may correspond to a pupil between the first portion 220 and third portion 224. As such, more light may be permitted to pass through the second portion 222 than the first portion 220 and the third portion 224.

Figure 8:
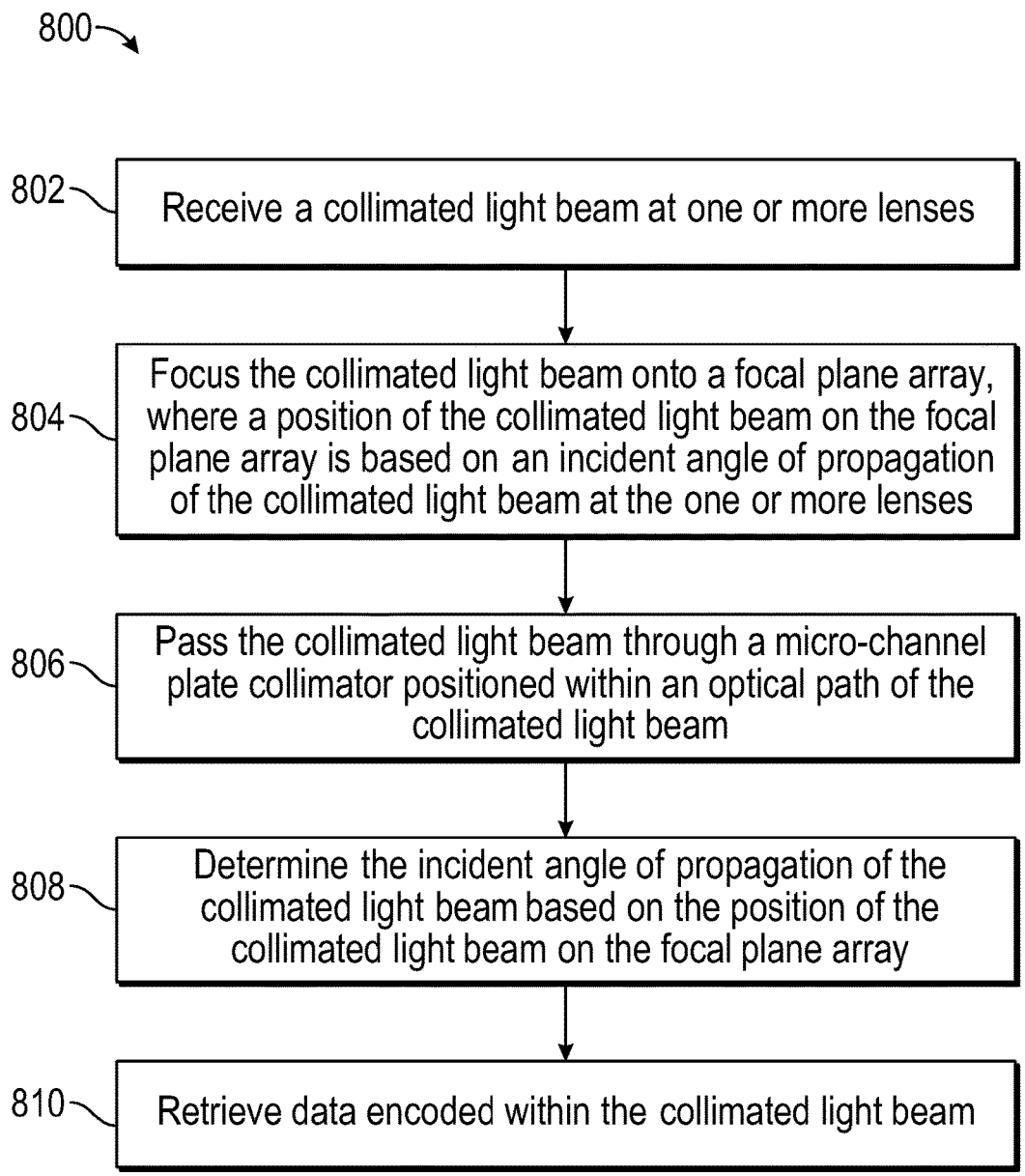
FIG. 8 depicts an embodiment of a method for receiving signal information using a free space optical link.

Referring to FIG. 8, a method 800 for receiving signal information using a free space optical link is depicted. The method 800 may include receiving a collimated light beam at one or more lenses, at 802. For example, the collimated light beam 110 may be received at the one or more lenses 102.

The method 800 may further include focusing the collimated light beam onto a focal plane array, where a position of the collimated light beam on the focal plane array is based on an incident angle of propagation of the collimated light beam at the one or more lenses, at 804. For example, the collimated light beam 110 may be focused onto the focal plane array 106.

The method 800 may also include passing the collimated light beam through a micro-channel plate collimator positioned within an optical path of the collimated light beam, at 806. For example, the collimated light beam 110 may pass through the micro-channel plate collimator 104.

The method 800 may include determining the incident angle of propagation of the collimated light beam based on the position of the collimated light beam on the focal plane array, at 808. For example, the processor 108 may determine the incident angle of propagation of the collimated light beam 110 based on the position 114 of the collimated light beam 110 on the focal plane array 106.

The method 800 may further include retrieving data encoded within the collimated light beam, at 810. For example, the processor 108 may retrieve data encoded within the collimated light beam 110.

A benefit of the method 800 is that a single set of lenses and focal plane array can be used to both determine the position of a source of the collimated light beam and retrieve data encoded within the collimated light beam as opposed to systems that require another narrow field optical system to retrieve the data. Other advantages may exist.

Although various embodiments have been shown and described, the present disclosure is not so limited and will be understood to include all such modifications and variations as would be apparent to one skilled in the art.

What is claimed is:

1. A system for optical detection comprising:
a focal plane array;
one or more lenses configured to focus a collimated light beam received at the one or more lenses onto the focal plane array, wherein a position of the collimated light beam on the focal plane array is based on an incident angle of propagation of the collimated light beam at the one or more lenses;
a micro-channel plate collimator positioned within an optical path of the collimated light beam; and
a processor configured to determine the incident angle of propagation of the collimated light beam and to retrieve data encoded within the collimated light beam; and
a dewar, wherein the focal plane array is positioned within the dewar, and wherein at least one of the one or more lenses extends through an exterior boundary of the dewar.

2. The system of claim 1, wherein the micro-channel plate collimator in in an electrically passive state.

3. The system of claim 1, wherein the micro-channel plate collimator comprises:
an opaque substrate having a first surface and a second surface; and
a plurality of transparent channels within the opaque substrate.

4. The system of claim 3, wherein the plurality of transparent channels within the opaque substrate are arranged in a square lattice pattern.

5. The system of claim 3, wherein the plurality of transparent channels within the opaque substrate are arranged in a triangle lattice pattern.

6. The system of claim 3, wherein the plurality of transparent channels within the opaque substrate are arranged in a square lattice pattern along a first portion of the micro-channel plate collimator, and wherein the plurality of transparent channels within the opaque substrate are arranged in a triangle lattice pattern along a second portion of the micro-channel plate collimator.

7. The system of claim 3, wherein a spatial density of the plurality of transparent channels within the opaque substrate along a first portion of the micro-channel plate collimator is less than along a second portion of the micro-channel plate collimator.

8. The system of claim 3, wherein the first surface is convexly curved and the second surface is concavely curved.

9. The system of claim 8, wherein a detection surface of the focal plane array is convexly curved.

10. The system of claim 1, further comprising: a cold stop including a cryogenically cold aperture.

11. The system of claim 1, wherein the micro-channel plate collimator is positioned within the dewar.

12. The system of claim 1, wherein the micro-channel plate collimator is positioned outside of the dewar.

13. A method for optical detection comprising:
receiving a collimated light beam at one or more lenses extending through an exterior boundary of a dewar;
focusing the collimated light beam onto a focal plane array within the dewar, wherein a position of the collimated light beam on the focal plane array is based on an incident angle of propagation of the collimated light beam at the one or more lenses;
passing the collimated light beam through a micro-channel plate collimator positioned within an optical path of the collimated light beam;
determining the incident angle of propagation of the collimated light beam based on the position of the collimated light beam on the focal plane array; and
retrieving data encoded within the collimated light beam.

14. The method of claim 13, further comprising:
receiving the collimated light beam into the dewar before the collimated light beam is passed through the micro-channel plate collimator.

15. The method of claim 13, further comprising:
receiving the collimated light beam into the dewar after the collimated light beam is passed through the micro-channel plate collimator.

16. A system comprising:
a micro-channel plate collimator apparatus comprising:
an opaque substrate having a first surface and a second surface; and
a plurality of cylindrical transparent channels within the opaque substrate, wherein
a spatial density of the plurality of cylindrical transparent channels within the opaque substrate is greater along a first portion of the micro-channel plate collimator apparatus than along a second portion of the micro-channel plate collimator apparatus,
a focal plane array;
one or more lenses; and
a dewar, wherein the focal plane array is positioned within the dewar, and wherein at least one of the one or more lenses extends through an exterior boundary of the dewar.

17. The system of claim 16, wherein the plurality of cylindrical transparent channels are arranged in a square lattice pattern along the first portion of the micro-channel plate collimator apparatus, and wherein the plurality of transparent channels are arranged in a triangle lattice pattern along the second portion of the micro-channel plate collimator apparatus.

18. The system of claim 16, wherein the plurality of cylindrical transparent channels have a first cross-section radius along the first portion of the micro-channel plate collimator apparatus and a second cross-section radius along the second portion of the micro-channel plate collimator apparatus, and wherein the first cross-section radius is smaller than the second cross-section radius.

19. The system of claim 16, wherein the plurality of cylindrical transparent channels have a first depth along the first portion of the micro-channel plate collimator apparatus and a second depth along the second portion of the micro-channel plate collimator apparatus, and wherein the first depth is smaller than the second depth.

20. The system of claim 16, the micro-channel plate collimator apparatus being incorporated into a free space optical link system of an aircraft.

* * * * *